(12) United States Patent
Hashimoto et al.

(10) Patent No.: US 7,982,907 B2
(45) Date of Patent: Jul. 19, 2011

(54) IMAGE GENERATING APPARATUS, IMAGE PROCESSING APPARATUS, PROGRAM PRODUCT AND METHOD FOR PRINTING MARKED-UP PRINT DATA IN COLOR APPROPRIATE FOR PRINTING

(75) Inventors: Yasuhiro Hashimoto, Osaka (JP); Haruna Sasakuma, Toyonaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1307 days.

(21) Appl. No.: 10/738,000

(22) Filed: Dec. 18, 2003

(65) Prior Publication Data
US 2005/0062987 A1 Mar. 24, 2005

(30) Foreign Application Priority Data
Sep. 18, 2003 (JP) .................................. 2003-326447

(51) Int. Cl.
H04N 1/60 (2006.01)
H04N 1/46 (2006.01)
G06F 3/12 (2006.01)
G06K 9/00 (2006.01)

(52) U.S. Cl. ......... 358/1.9; 358/1.13; 358/538; 382/167

(58) Field of Classification Search .................. 358/1.9, 358/1.13, 1.16, 501, 502, 538, 540, 539, 358/523, 518; 382/162, 164, 165, 167, 175, 382/180
See application file for complete search history.

(56) References Cited

U.S. PATENT DOCUMENTS

| 5,016,096 A | * | 5/1991 | Matsunawa et al. | 358/538 |
| 5,132,786 A | * | 7/1992 | Ishiwata | 358/500 |
| 5,241,609 A | * | 8/1993 | Hasebe et al. | 382/163 |
| 5,296,946 A | * | 3/1994 | Kadowaki et al. | 358/531 |
| 5,363,212 A | * | 11/1994 | Taniuchi et al. | 358/452 |
| 5,465,307 A | * | 11/1995 | Azumaya et al. | 382/165 |
| 5,481,378 A | * | 1/1996 | Sugano et al. | 358/501 |
| 5,497,431 A | * | 3/1996 | Nakamura | 382/162 |
| 5,548,663 A | * | 8/1996 | Sekine et al. | 382/164 |
| 5,557,688 A | * | 9/1996 | Nakamura | 382/164 |
| 5,576,847 A | * | 11/1996 | Sekine et al. | 358/448 |
| 5,579,407 A | * | 11/1996 | Murez | 382/164 |
| 6,016,209 A | * | 1/2000 | Motosugi | 358/537 |
| 6,079,824 A | * | 6/2000 | Gotoh | 347/100 |

(Continued)

FOREIGN PATENT DOCUMENTS

JP 01-234250 9/1989

(Continued)

OTHER PUBLICATIONS

Japanese Office Action dated Oct. 2, 2007, directed to counterpart Japanese Application No. 2003-326447 (7 pages).

(Continued)

*Primary Examiner* — Madeleine A Nguyen
(74) *Attorney, Agent, or Firm* — Morrison & Foerster LLP

(57) ABSTRACT

In order to print a marked-up region in a color appropriate for printing, a MFP includes a communicating portion to which print data is input, a marked-up region extract portion for extracting a marked-up region from the print data, a marked-up region converter for converting a color of the extracted marked-up region to a conversion color appropriate for printing, and a printer for printing the marked-up region extracted from the print data in the conversion color.

27 Claims, 8 Drawing Sheets

U.S. PATENT DOCUMENTS

| | | | |
|---|---|---|---|
| 6,346,994 B1* | 2/2002 | Inoue | 358/1.9 |
| 6,373,602 B1* | 4/2002 | Kohler et al. | 358/538 |
| 6,412,898 B1* | 7/2002 | Danzuka et al. | 347/15 |
| 6,445,463 B1* | 9/2002 | Klassen | 358/1.9 |
| 6,493,115 B1* | 12/2002 | Kanno et al. | 358/538 |
| 6,766,056 B1* | 7/2004 | Huang et al. | 382/190 |
| 6,771,395 B1* | 8/2004 | Kito | 358/474 |
| 6,809,742 B1* | 10/2004 | Motosugi et al. | 345/619 |
| 7,251,054 B2* | 7/2007 | Takemoto | 358/1.9 |
| 7,265,851 B2* | 9/2007 | Kinjo | 358/1.1 |
| 7,317,563 B2* | 1/2008 | Kinjo | 358/540 |
| 7,479,968 B2* | 1/2009 | Brown et al. | 345/592 |
| 7,729,013 B2* | 6/2010 | Nishida | 358/2.1 |
| 2001/0048530 A1* | 12/2001 | Hayashi et al. | 358/1.13 |
| 2003/0052942 A1* | 3/2003 | Yashima et al. | 347/43 |
| 2003/0086134 A1* | 5/2003 | Enomoto | 358/538 |
| 2003/0123112 A1* | 7/2003 | Kajita et al. | 358/538 |
| 2003/0132977 A1* | 7/2003 | Moto et al. | 347/14 |
| 2003/0189730 A1* | 10/2003 | Enomoto | 358/3.26 |
| 2004/0190025 A1* | 9/2004 | Nomura et al. | 358/1.9 |
| 2005/0024408 A1* | 2/2005 | Yashima et al. | 347/15 |
| 2005/0036173 A1* | 2/2005 | Hayashi et al. | 358/2.1 |
| 2005/0219618 A1* | 10/2005 | Shimada | 358/2.1 |
| 2006/0238551 A1* | 10/2006 | Dalal | 345/690 |

FOREIGN PATENT DOCUMENTS

| | | |
|---|---|---|
| JP | 02-224569 A | 9/1990 |
| JP | 09-284534 A | 10/1997 |
| JP | 11-078060 A | 3/1999 |
| JP | 11-227173 | 8/1999 |
| JP | 2000-085188 | 3/2000 |
| JP | 2001-018456 A | 1/2001 |
| JP | 2001-237783 A | 8/2001 |
| JP | 2001-274964 A | 10/2001 |
| JP | 2001-331164 A | 11/2001 |
| JP | 2002-011923 A | 1/2002 |
| JP | 2002-290762 A | 10/2002 |
| JP | 2002-301813 A | 10/2002 |
| JP | 2003-263035 A | 9/2003 |

OTHER PUBLICATIONS

Translation of Japanese Final Decision for Rejection mailed Jun. 17, 2008, directed to counterpart JP application No. 2003-326447; 4 pages.

* cited by examiner

F I G. 2
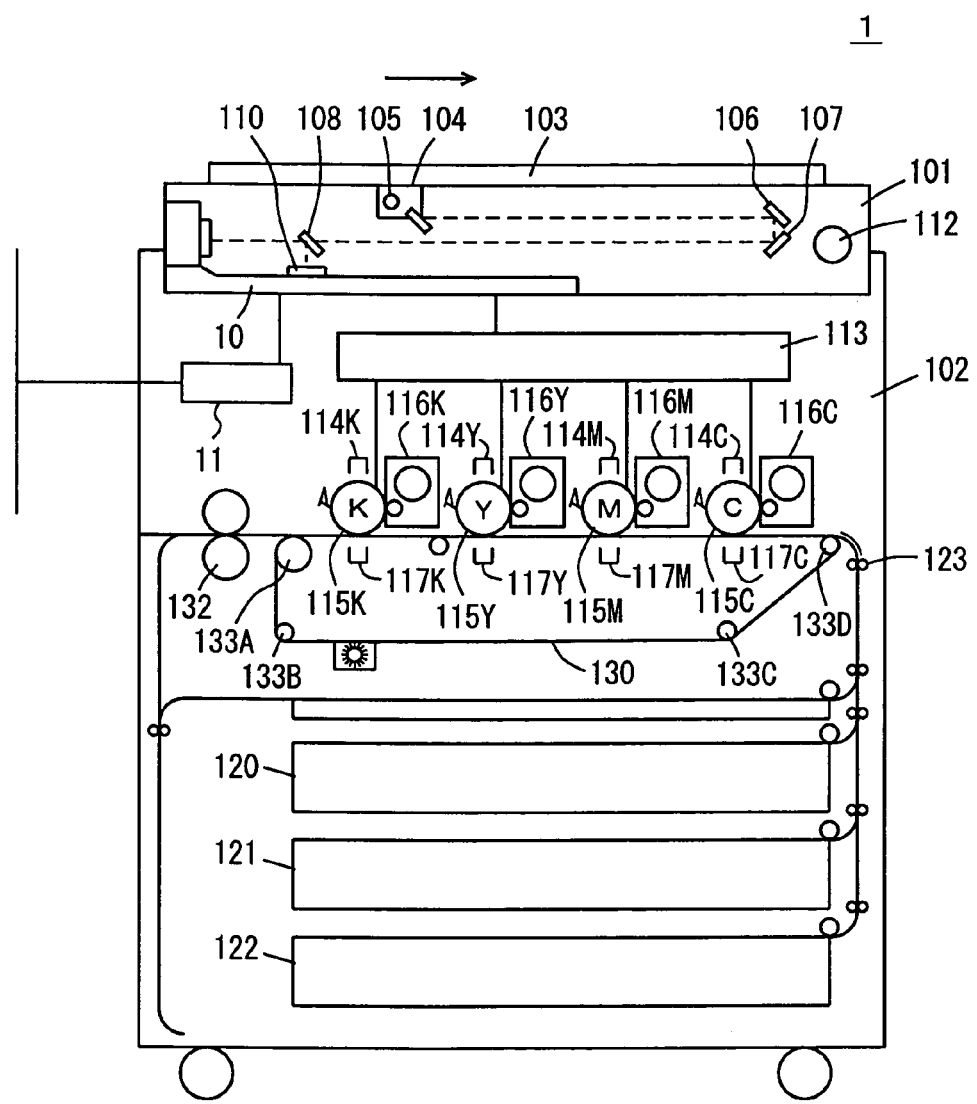

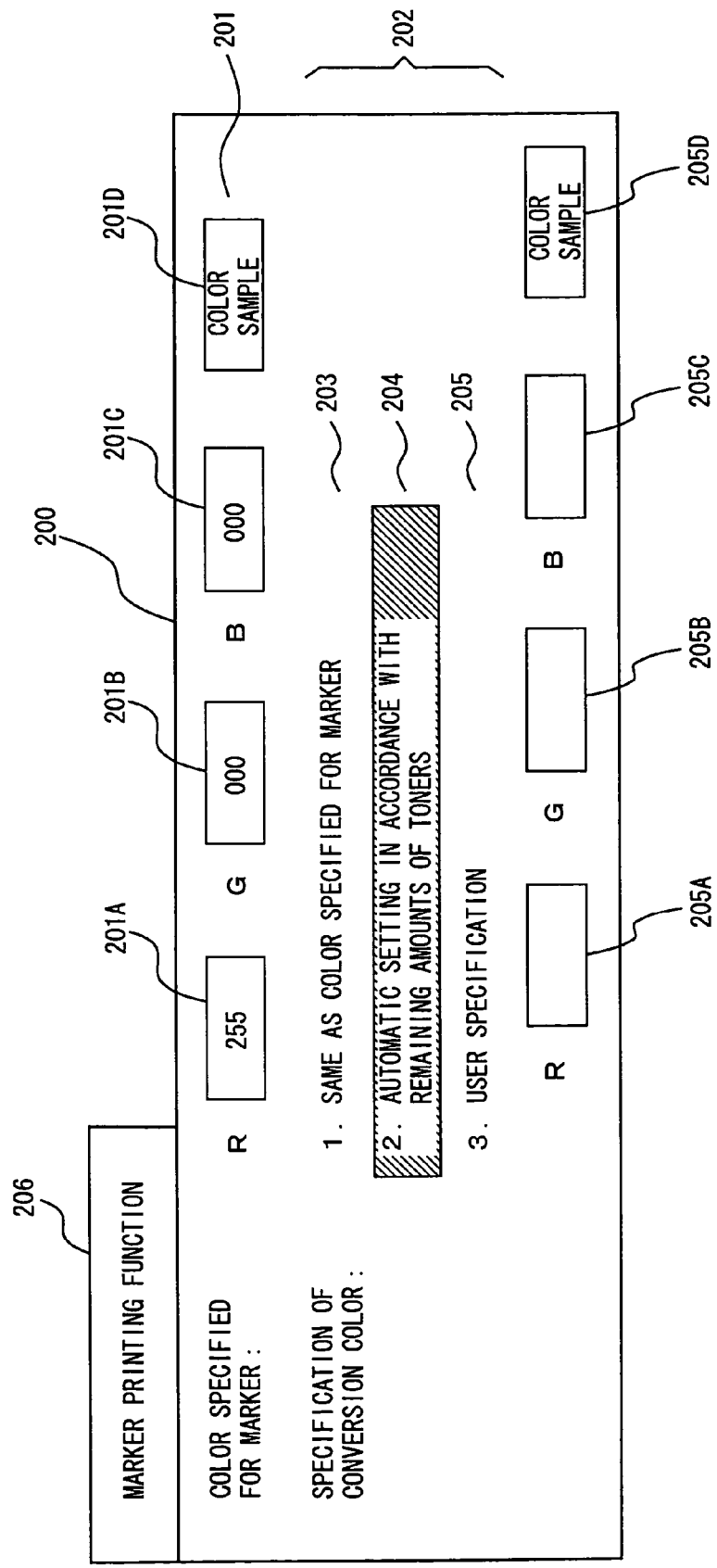

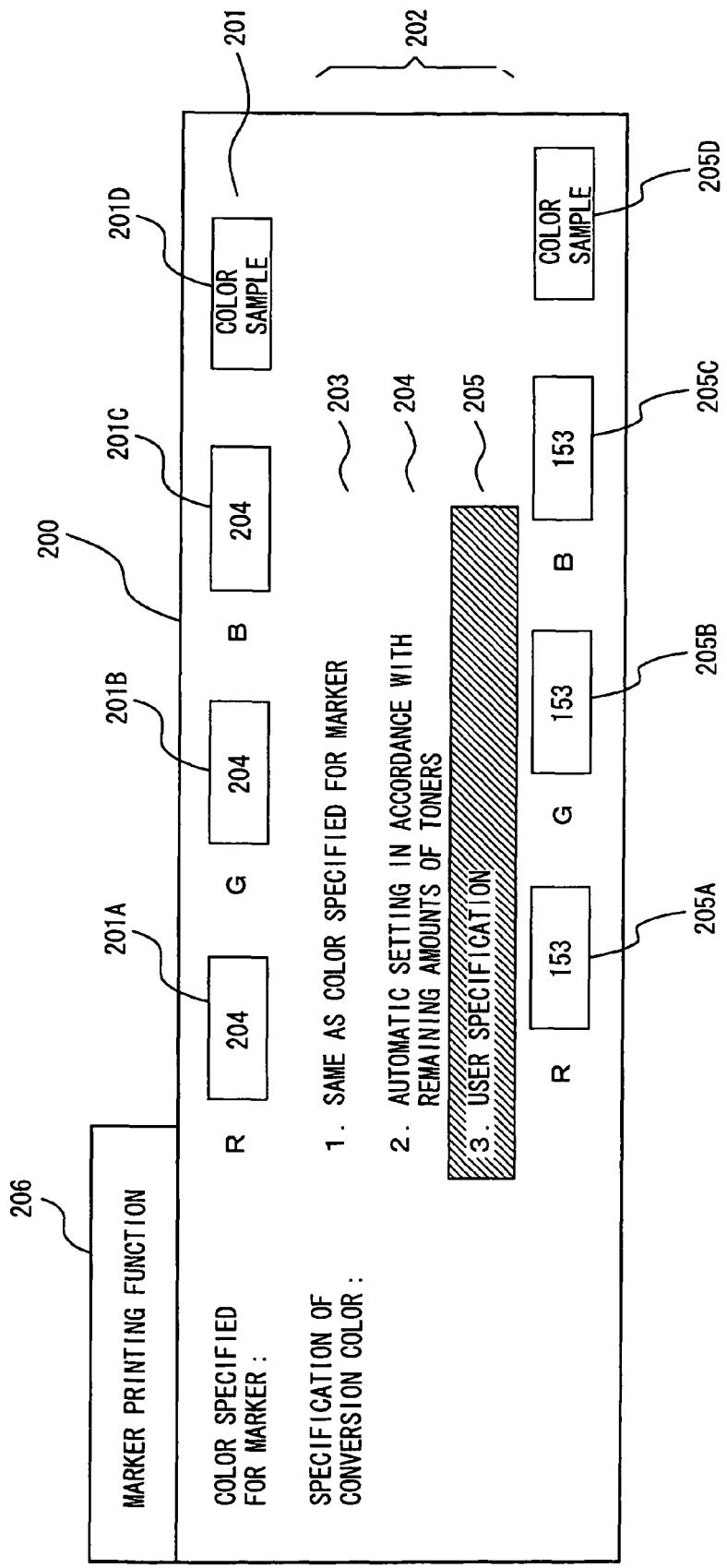

IMAGE GENERATING APPARATUS, IMAGE PROCESSING APPARATUS, PROGRAM PRODUCT AND METHOD FOR PRINTING MARKED-UP PRINT DATA IN COLOR APPROPRIATE FOR PRINTING

This application is based on Japanese Patent Application No. 2003-326447 filed with Japan Patent Office on Sep. 18, 2003, the entire content of which is hereby incorporated by reference.

BACKGROUND OF THE INVENTION

1. Field of the Invention

The present invention relates to an image generating apparatus, an image processing apparatus, a program product and a method. More particularly, the present invention relates to an image generating apparatus, an image processing apparatus, a program product and a method for printing marked-up print data in a color appropriate for printing.

2. Description of the Related Art

Conventionally, in an application executed in a personal computer (PC), characters or regions are partially highlighted in a document. Since a user tends to select a particular color for highlight according to his/her preference, such a color material as toner and ink of the user-selected color may only be consumed. Accordingly, consumption of the particular color material increases.

Furthermore, brightness difference, which is sharply displayed on a display screen, may appear less sharply when printed.

A technique of uniformly consuming ink of different colors is disclosed in Japanese Laid-Open Patent Publication No. 11-227173, which describes a technique of selecting ink to be used for test print in accordance with the remaining amounts of the ink.

According to Japanese Laid-Open Patent Publication No. 11-227173, however, the remaining amounts of the ink are equalized for test print only, and the imbalance of consumed amounts of ink caused by the preference for a particular color for markup cannot be corrected.

Furthermore, disadvantageously, brightness difference, which is sharply displayed on a screen, may appear less sharply on a printing image. Furthermore, depending on the correlation between a printing color and a color of a recording medium on which an image is formed, i.e., a background color of the image, printed characters and the like may appear less visible. For example, when characters are printed in yellow on white paper, the yellow characters appear less visible.

SUMMARY OF THE INVENTION

The present invention is provided to solve the problems described above. An object of the present invention is to provide an image generating apparatus and a print data processing program product which are capable of printing a marked-up region in a color appropriate for printing.

Another object of the present invention is to provide an image generating apparatus and a print data processing program product which are capable of equalizing remaining amounts of the color materials of different colors in printing print data including a marked-up region.

Still another object of the present invention is to provide an image generating apparatus and a print data processing program product which are capable of printing a marked-up region to be discriminated sharply from other regions.

In order to achieve the objects above, according to an aspect of the present invention, an image generating apparatus includes: an input portion for inputting print data; an extract portion for extracting a marked-up region from the print data; a converter for converting a color of the extracted region to a color appropriate for printing; and an image generator for printing the marked-up region extracted from the print data in the color converted by the converter.

According to the present invention, an image generating apparatus capable of printing a marked-up region in a color appropriate for printing can be provided.

According to another aspect of the present invention, an image generating apparatus includes: an input portion for inputting print data; a receiver for receiving designation of a specification color; an extract portion for extracting a region marked up with the specification color from the input print data; an acquisition portion for acquiring information about a remaining amount of a color material; a converter for converting the specification color of the extracted region to another color based on the information about the remaining amount of a color material; and an output portion for outputting the print data including the marked-up region whose color has been converted.

According to the present invention, a region marked up with a specified color is output with its color converted to another color based on information about the remaining amounts of color materials. Accordingly, if the specified color is converted to a color in which a color material remaining in larger amount is contained in larger amount relative to other color materials, for example, an image generating apparatus capable of equalizing the remaining amounts of the color materials of different colors in printing print data including a marked-up region can be provided.

According to still another aspect of the present invention, an image generating apparatus includes: a converter for converting a color of a marked-up region in data to another color; a receiver for receiving an instruction as to whether the converter is to perform conversion or not; a controller for activating the converter if the receiver receives an instruction to perform the conversion; and an image processor for generating an image of the marked-up region as data of the color converted by the converter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows a schematic cross section illustrating a general configuration of a MFP in the embodiment.

FIGS. 5A-5C show an example of a color conversion specifying screen displayed on the operation panel.

DESCRIPTION OF THE PREFERRED EMBODIMENTS

Figure 1:
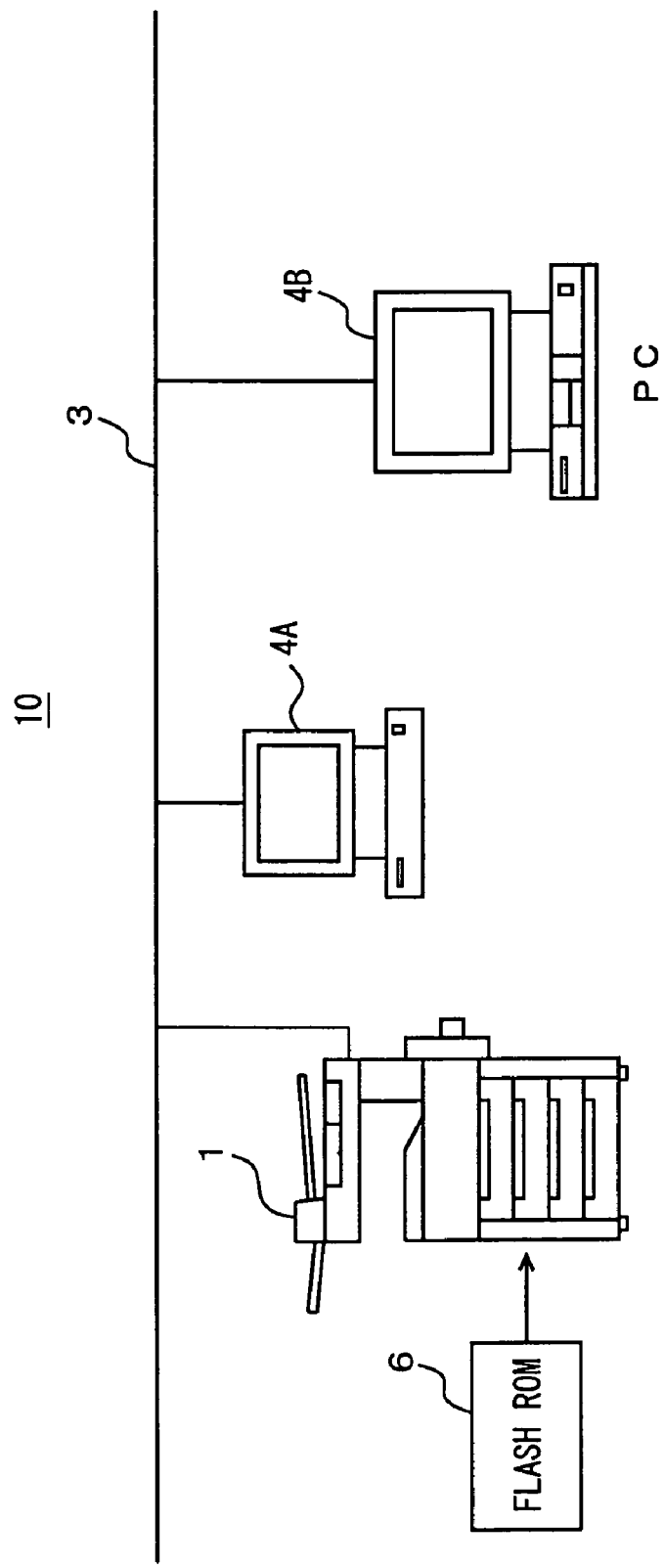
FIG. 1 shows an overview of a printing system in one embodiment of the present invention.

Hereinafter, embodiments of the present invention will be described with reference to the drawings. In the following description, the same components are represented by the same reference characters and have the same names and functions. Therefore, detailed description thereof will not be repeated.

FIG. 1 shows an overview of a printing system according to one embodiment of the present invention. Referring to FIG. 1, the printing system includes an all-in-one unit 1 (hereinafter referred to as "Multi Function Peripheral 1" or "MFP 1") and user computers 4A and 4B, each of which is connected to a network 3. User computers 4A and 4B are general personal computers. In FIG. 1, an embodiment in which one MFP 1 and two user computers 4A and 4B are connected. However, the number thereof is not limited thereto and a plurality of MFPs and a plurality of user computers may be connected to network 3.

MFP 1 includes a scanner for reading a document, an image generating apparatus for generating an image on a recording medium such as paper based on image data, and a facsimile, and has an image reading function, a copying function, a facsimile sending/receiving function, and a printing function for printing data. MFP 1 uses the image generating apparatus to generate an image on a recording medium such as paper based on print data written in a page description language and received from user computer 4 or based on image data output by the scanner.

A detachable flash read only memory (ROM) 6 is also included in MFP 1. A print data processing program stored in flash ROM 6 is executed by a central processing unit (CPU) included in MFP 1. In flash ROM 6, the stored content can be overwritten or written additionally. Accordingly, another computer connected to network 3 may be configured to overwrite the print data processing program stored in flash ROM 6 or to write a new print data processing program additionally. Furthermore, MFP 1 may be configured to download the print data processing program from another computer connected to network 3 and store the same in flash ROM 6.

User personal computers 4A and 4B, as appropriate, read onto a random access memory (RAM) an application program such as a word processing program, a spreadsheet program and a drawing program recorded on a hard disk and the like, and execute the same in CPU. User personal computers 4A and 4B have the application program executed to generate print data, which is transmitted to MFP 1 via network 3. The print data is written in a page description language. Output data formed by the execution of the application program described above may include a marked-up region formed by coloring, reverse, underlining or the like for characters or regions which a user wants to highlight partially. The print data written in a page description language includes information about the region marked up as such.

Network 3 is a local area network (LAN), the Internet or a public telephone network, and may be wired or wireless. Though the case where MFP 1 and user computers 4A and 4B are connected via network 3 is shown here, MFP 1 and user computers 4A and 4B may be connected via a serial or parallel line.

Though the case where the print data processing program to be executed in MFP 1 is stored in a flash ROM for distribution is shown here, the print data processing program may be stored on other recording media such as a flexible disk, a cassette tape, a CD-ROM, a hard disk, an optical disk (a magnetic optical disc (MO)/a mini disc (MD)/a digital versatile disc (DVD)), an IC card (including a memory card), an optical card, or a semiconductor memory such as a mask ROM, an erasable programmable read-only memory (EPROM), and an electrically erasable/programmable read-only memory (EEPROM), which fixedly hold a program.

The program as stated herein covers a concept including, not only a program directly executable by a CPU, but a program in the form of a source program, a compressed program, an encrypted program, and the like.

FIG. 2 shows a schematic cross section illustrating a general configuration of the MFP in this embodiment. Referring to FIG. 2, MFP 1 includes an image reader 101 for reading image data from a document, a controller 10 for controlling the entire MFP 1, a printer 102 for printing an image on a sheet of paper, and a communicating portion 11 for connecting MFP 1 to network 3.

MFP 1 receives print data from user computers 4A and 4B. Therefore, controller 10 communicates with user computers 4A and 4B at communicating portion 11 via network 3. Controller 10 receives from user computers 4A and 4B print data written in a page description language. Controller 10 converts the received print data to a bit-mapped image data.

Furthermore, image reader 101 in MFP 1 reads a document, and the image data thereof is input to controller 10. The document placed on a platen 103 of image reader 101 is irradiated by an exposure lamp 105 mounted to a scanner 104. Scanner 104 scans the entire document as it is moved by a scanner motor 112 in the direction indicated by the arrow in FIG. 2. Reflected light from the document surface focuses into an image on a charge coupled device (CCD) 110 via mirrors 106-108 and a condensing lens. CCD 110 converts the reflected light from the document surface to RGB color data (analog signals) and outputs the same to controller 10. The color data output from CCD 110 to controller 10 corresponds to image data.

Controller 10 performs a prescribed image processing on the image data obtained from the print data received from user computers 4A and 4B or on the image data input from image reader 101 so as to output digital signals to a laser device 113 in printer 102.

Here, the digital signals output from controller 10 to laser device 113 include image color data C for cyan, image color data M for magenta, image color data Y for yellow and image color data K for black. Laser device 113 outputs laser beams to photoconductor drums 115C, 115M, 115Y and 115K of cyan, magenta, yellow and black, respectively, based on the input image color data C, M, Y and K.

In printer 102, the laser beams output from laser device 113 expose photoconductor drums 115C, 115M, 115Y and 115K charged by electrostatic chargers 114C, 114M, 114Y and 114K, respectively, to generate electrostatic latent images. The electrostatic latent images on photoconductor drums 115C, 115M, 115Y and 115K are then developed by developing units 116C, 116M, 116Y and 116K of four colors of cyan, magenta, yellow and black, respectively.

An endless belt 130 is suspended by a drive roller 133A and fixed rollers 133B, 133C and 133D so as to be kept tight. As drive roller 133A rotates counterclockwise as seen in FIG. 2, endless belt 130 rotates counterclockwise in FIG. 2 at a prescribed rate.

A sheet of paper with an appropriate size is transported from one of paper feed cassettes 120-122 and fed from a timing roller 123 onto endless belt 130. The paper fed to endless belt 130 is held thereon and transported in the left direction as seen in FIG. 2. As a result, the paper comes into contact with photoconductor drums 115C, 115M, 115Y and 115K in the order of cyan, magenta, yellow and black. When the paper contacts respective photoconductor drums 115C, 115M, 115Y and 115K, the toner images developed on the respective photoconductor drums are transferred onto the paper by transfer chargers 117C, 117M, 117Y and 117K which are paired with the respective photoconductor drums.

The paper where the toner images are transferred is heated by a pair of fixing rollers 132. As a result, the toner is melted and fixed on the paper. The paper is then ejected from printer 102.

Figure 3:
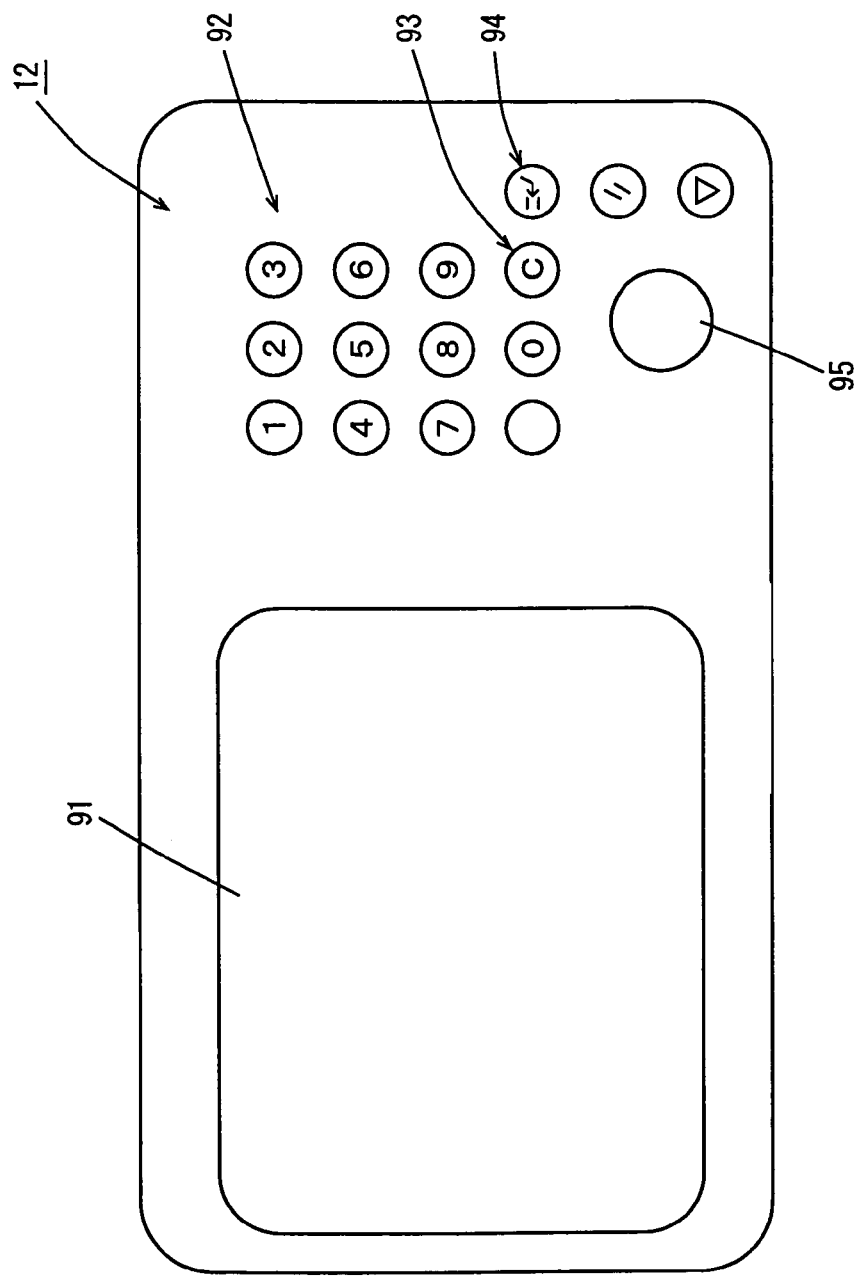
FIG. 3 is a plan view of an operation panel included in the MFP in the embodiment.

MFP 1 has an operation panel 12 on its top surface. FIG. 3 is a plan view of operation panel 12 mounted to the MFP shown in FIG. 1. Referring to FIG. 3, operation panel 12 is provided with a liquid crystal panel 91, a numeric keypad 92, a clear key 93 for initializing a set value, an interrupt key 94 for performing interrupt printing, and a copy start key 95.

Liquid crystal panel 91 is formed of a liquid crystal display and a touch panel made of a transparent material mounted thereon. The touch panel serves as an input device. Operation panel 12 displays a button, for example, on the liquid crystal display and detects by the touch panel the operation by a user pushing the displayed button. As such, there is no need for using a switch button fixed on the input device, which allows an input of various operations.

Though the embodiment is described with reference to, by way of example, an image generating apparatus which uses toner as a color material, an ink jet printer or the like which uses ink as a color material may be used.

Figure 4:
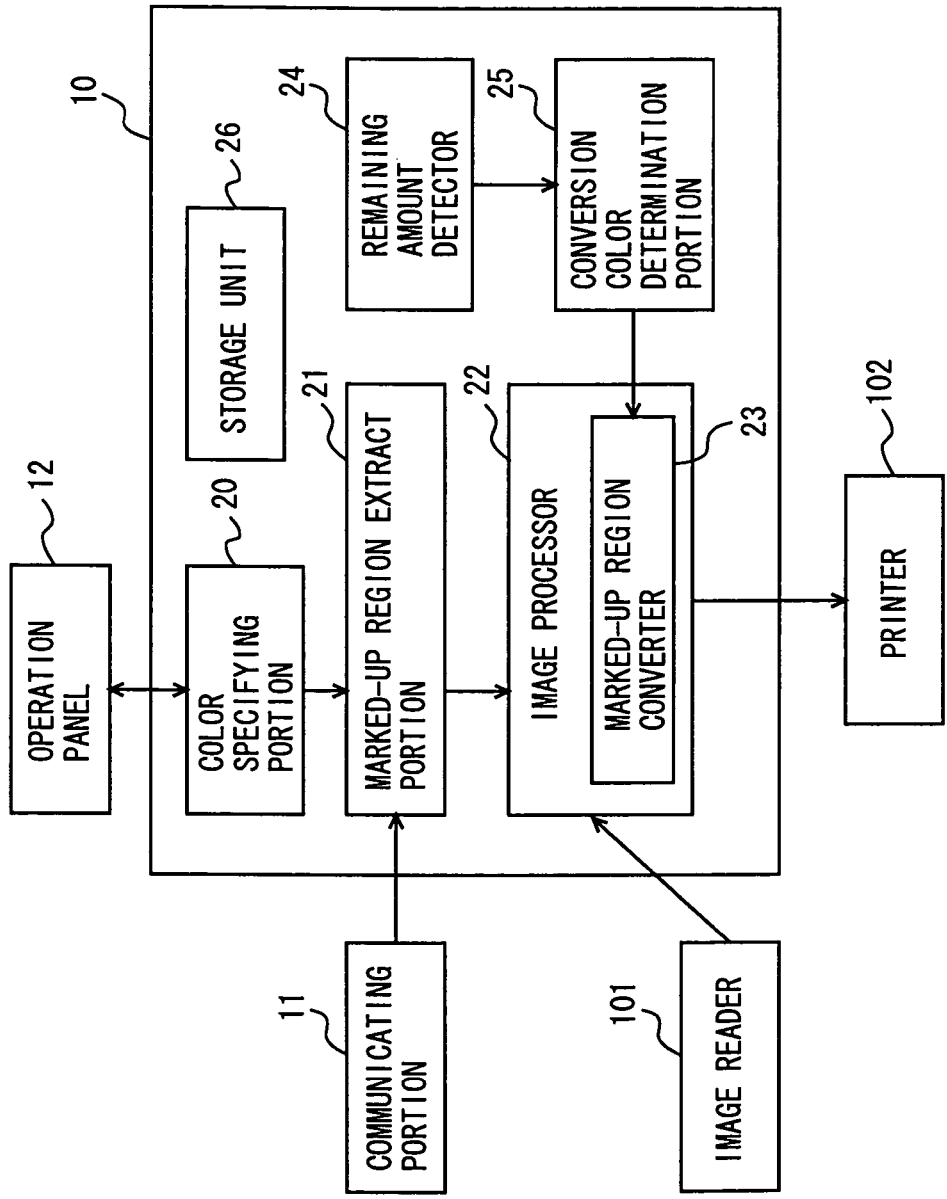
FIG. 4 is a functional block diagram illustrating a functional outline of a controller of the MFP in the embodiment.

FIG. 4 is a functional block diagram illustrating a functional outline of the controller of the MFP in this embodiment. Referring to FIG. 4, controller 10 includes a color specifying portion 20 connected to operation panel 12, a marked-up region extract portion 21 connected to communicating potion 11, a remaining amount detector 24 for detecting a remaining amount of the toner, a conversion color determination portion 25 for determining a conversion color resultant from conversion, an image processor 22 for performing a prescribed image processing on image data input from marked-up region extract portion 21 or from image reader 101, and a storage unit 26 for storing information.

Controller 10 temporarily stores print data received from user computers 4A and 4B in storage unit 26, and as appropriate, reads the print data therefrom to generate image data. Storage unit 26 is, for example, a semiconductor memory such as a random access memory (RAM) or a magnetic memory such as a hard disk.

Color specifying portion 20 receives from operation panel 12 a color specified by a user, which is herein referred to as a specification color. The specification color is defined as a color which the user wants to use for color conversion among other colors given to the marked-up region. When the user designates the specification color from operation panel 12, the specification color is received by color specifying portion 20 and stored in storage unit 26. The specification color stored in storage unit 26 is read by marked-up region extract portion 21. Not a single color but a plurality of colors can be designated as the specification colors. In this case, a plurality of specification colors are stored in storage unit 26. Note that the specification color is not necessarily designated. If the specification color is not designated, no specification color is stored in storage unit 26. In this case, marked-up region extract portion 21 extracts the entire marked-up region.

Print data is input from communicating portion 11 to marked-up region extract portion 21, which in turn extracts a marked-up region from the print data. The marked-up region includes a region specified to be output in a color except for black, a region specified to be output in black and formatted to include reversed characters, an underline or the like. If a specification color is stored in storage unit 26, marked-up region extract portion 21 reads the specification color and extracts a region marked up with the specification color from the extracted marked-up region. The extracted marked-up region is output to image processor 22. If a plurality of specification colors are stored in storage unit 26, all the regions marked up with the specification colors are extracted from the extracted marked-up region. If no specification color is stored in storage unit 26, marked-up region extract portion 21 extracts the entire marked-up region.

Remaining amount detector 24 detects a remaining amount of a toner stored in a toner container mounted to each of developing units 116C, 116M, 116Y and 116K of four colors of cyan, magenta, yellow and black, respectively. Remaining amount detector 24 is a sensor provided to each of developing units 116C, 116M, 116Y and 116K for detecting a remaining amount of the toner for each of the four colors. Remaining amount detector 24 is a gravimetric sensor, for example, and calculates the remaining amount of the toner from its weight. Remaining amount detector 24 may alternatively be an optical sensor, which can detect the vertical level of the toner stored in the toner container to detect the remaining amount thereof from its volume. Furthermore, remaining amount detector 24 may be configured to detect the remaining amount of the toner from its consumed amount: the consumed amount of the toner for each printing operation by printer 102 is calculated; the consumed amount is then accumulated; and the accumulated value is subtracted from an initial amount thereof to determine the remaining amount. In this case, there is no need for providing a gravimetric sensor, an optical sensor or the like.

The remaining amounts of the toners of four colors respectively are input from remaining amount detector 24 to conversion color determination portion 25. Conversion color determination portion 25 determines a conversion color in accordance with the input remaining amounts of the toners of four colors. Conversion color determination portion 25 then outputs the determined conversion color to a marked-up region converter 23. Methods of determining a conversion color are as follows.

Method 1: A conversion color is determined based on the ratio of the remaining amounts of the toners.

If the ratio of the remaining amounts of the toners respectively of cyan (C), magenta (M) and yellow (Y) is C:M:Y, a conversion color is defined as a color made by mixing the toners of the three colors at a ratio of C:M:Y. If the ratio of the remaining amounts is 2:3:1, for example, a conversion color is defined as a color made by mixing the toners of the three colors at the ratio of 2:3:1. Alternatively, a conversion color may be defined as a color made by mixing the toners of the three colors at a ratio of mC:mM:mY, where "m" is a constant by which the ratio is multiplied. If the ratio of the remaining amounts is 2:3:1 and constant m is "2", for example, a conversion color is defined as a color made by mixing the toners of the three colors at the ratio of 4:6:1. Alternatively, a conversion color may be defined as a color made by mixing the toners of the three colors at a ratio of Cn:Mn:Yn, where n is a natural number, namely the n-th power of the ratio. If the ratio of the remaining amounts is 2:3:1 and constant n is "2", for example, a conversion color is defined as a color made by mixing the toners of the three colors at the ratio of 4:9:1.

Method 2: A conversion color is determined based on the remaining amounts of the toners.

A conversion color is defined as a color made by selecting the toners of cyan (C), magenta (M) and yellow (Y) in descending order in terms of the remaining amounts thereof and mixing the same at a prescribed ratio. The prescribed ratio may be determined such that a toner remaining in larger amount relative to other toners is included in the conversion color at a higher volume ratio. All colors of cyan (C), magenta (M) and yellow (Y) of the toners may be selected, or at most two colors thereof may be selected.

Here, the methods of determining a conversion color in accordance with the remaining amounts of the toners of cyan (C), magenta (M) and yellow (Y) except for black are described. However, the remaining amount of the black toner may be included to determine a conversion color. Since document data generally contains characters in black, if a conversion color is then defined as black or a color having a hue similar to that of black, a marked-up region will not be highlighted. Therefore, a conversion color is preferably determined in accordance with the remaining amounts of the toners except for the black toner. However, a color containing black toner, which may appear clearly different from black on the printed data, may be defined as a conversion color. Alternatively, when characters which are not marked up are displayed in a color different from black, marked-up characters may be printed in black. In this case, a conversion color can be determined in accordance with the remaining amounts of the toners of all colors including black.

Image processor 22 is connected to printer 102 and outputs the image-processed data to laser device 113 in printer 102. The image data which is image-processed by image processor 22 includes image data input from image reader 101 and image data input from marked-up region extract portion 21. Image processing includes, for example, smoothing process, edge enhancement process, skew correction process, color matching process, contrast adjustment process and the like. When image processor 22 adjusts contrast, the conversion color is corrected to enhance contrast relative to a color of surrounding pixels. Furthermore, image processor 22 converts RGB image data into CMYK image data. Though image processing performed by image processor 22 may be intended for the RGB image data, contrast adjustment thereamong is performed on the CMYK image data. Accordingly, the conversion color determined by conversion color determination portion 25 is corrected by contrast adjustment process.

Image processor 22 further includes marked-up region converter 23. With respect to the image data converted to CMYK image data out of the image data input from marked-up region extract portion 21, marked-up region converter 23 converts a pixel value of the marked-up region extracted by marked-up region extract portion 21 to that of the conversion color. There are two types of conversion colors input to marked-up region converter 23 in image processor 22: a conversion color determined by conversion color determination portion 25; and a conversion color input from operation panel 12 by the operation of a user. Which conversion color to use is determined by an instruction input from operation panel 12 by the operation of a user. The conversion color specified by a user is stored in storage unit 26 in advance.

[Modification of Conversion Color Determination Portion 25]

In conversion color determination portion 25 in MFP 1 described above, a conversion color is determined based on the remaining amounts of the toners or the ratio thereof. However, a conversion color may be determined based on respective unit prices of the toners. In this case, storage unit 26 stores in advance the unit prices of toners of cyan (C), magenta (M) and yellow (Y). The conversion color determination portion selects the toners of cyan (C), magenta (M) and yellow (Y) in ascending order in terms of the unit prices thereof and mixes the same at a prescribed ratio so as to define a conversion color. The prescribed ratio may be determined such that a toner of a lower unit price relative to other toners is included in the conversion color at a higher volume ratio. The toners may be selected from all colors of cyan (C), magenta (M) and yellow (Y), or at most two colors thereof. In this case, there is no need for remaining amount detector 24.

Figure 5A:
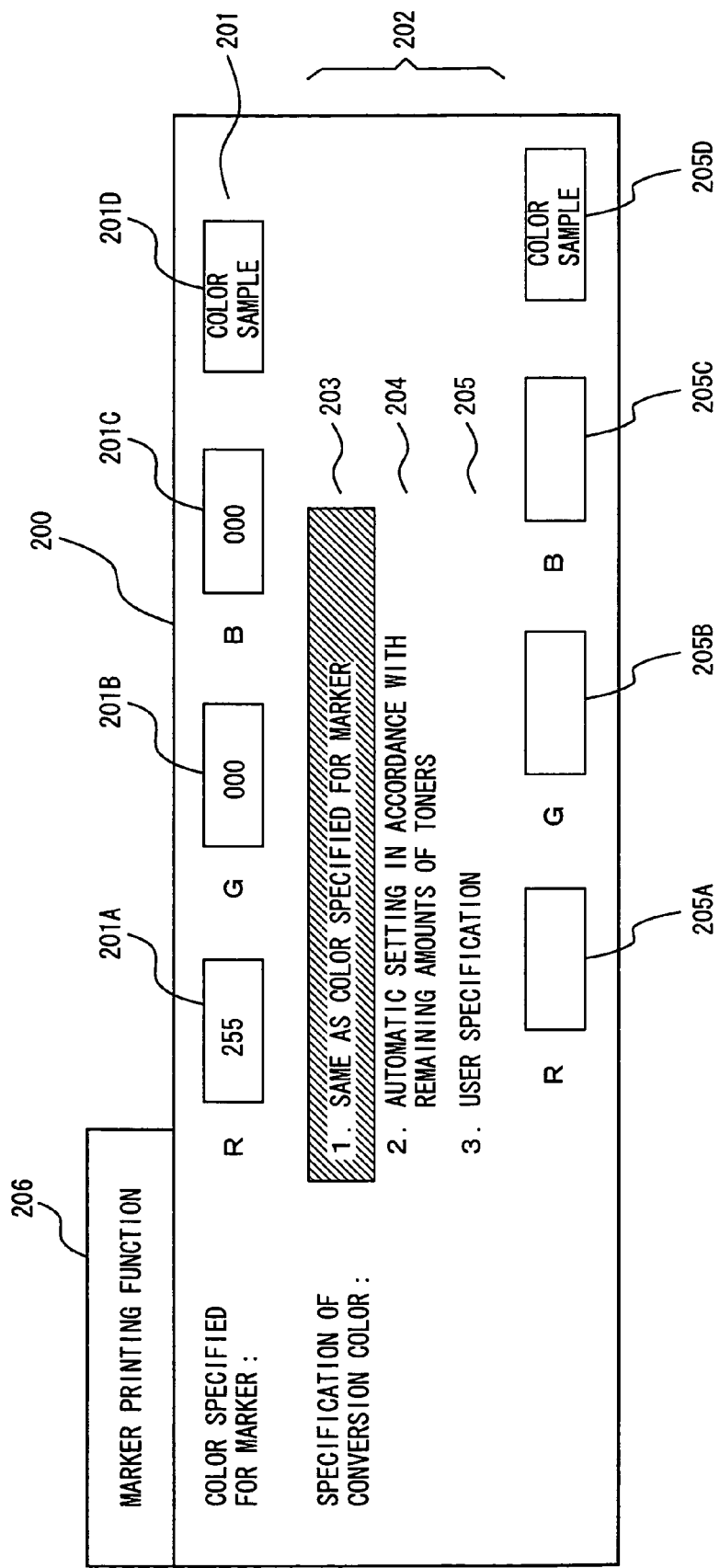

FIGS. 5A-5C show an example of a color conversion specifying screen displayed on the operation panel. A color conversion specifying screen 200 is a screen for setting MFP 1 to a color conversion mode. Color conversion specifying screen 200 is displayed on liquid crystal touch panel 91 of operation panel 12 by touching with a finger a tag button 206 labeled with a character string of "Marker Printing Function".

Referring to FIG. 5A, color conversion specifying screen 200 includes a specification color specifying region 201 and a conversion color specifying region 203. Region 201 includes a region 201A for specifying a value of red (R), a region 201B for specifying a value of green (G), a region 201C for specifying a value of blue (B), and a region 201D labeled with characters of "color sample". A user specifies respective regions 201A, 201B and 201C on color conversion specifying screen 200 to input values of red, green and blue, respectively, by using numeric keypad 92. Accordingly, a specification color is determined. If a user does not input a specification color and pushes start key 95 with regions 201A, 201B and 201C left blank, it is judged that a specification color is not designated, and a color of the entire marked-up region is converted to a conversion color.

Region 201D is a button switch for an instruction to display a color sample. When a user touches region 201D with a finger, a color palette is displayed in an overlapping manner on a section of color conversion specifying screen 200. Note that region 201D may simply be labeled with characters "color". In other words, region 201D may be provided with any label recognizable by a user as a button switch for an instruction to display a color sample. The color palette is a screen for displaying a plurality of color samples. When a user touches a section thereof displaying a desired color in the displayed color palette, the color is determined as a specification color, and its values of red, green and blue are determined, respectively. The determined values of red, green and blue are displayed in regions 201A, 201B and 201C, respectively. As such, since a user can select a desired color from the color palette without knowing respective values of red, green and blue thereof, a specification color can easily be designated. Note that the color palette does not display all the colors. When colors to be used for markup in an application program are predetermined, the predetermined colors are displayed as a sample.

Conversion color specifying region 202 displays a menu of choices as to how to set a conversion color. The choices include a choice 203 labeled with a character string of "1. Same as Color Specified for Marker", a choice 204 labeled with a character string of "2. Automatic Setting in Accordance with Remaining Amounts of Toners", and a choice 205 labeled with a character string of "3. User Specification". FIG. 5A shows choice 203 selected and displayed reversely with hatching. FIG. 5B shows choice 204 selected and displayed reversely with hatching. FIG. 5C shows choice 205 selected and displayed reversely with hatching.

When choice 203 is selected, a conversion color is not specified. Accordingly, marked-up region converter 23 of controller 10 does not convert a color of the marked-up region. When choice 204 is selected, a color determined by conversion color determination portion 25 is defined as a conversion color. Accordingly, marked-up region converter 23 converts a color of the marked-up region to the color determined by conversion color determination portion 25. When choice 205 is selected, a color specified by a user is determined as a conversion color. Accordingly, marked-up region converter 23 converts a color of the marked-up region to the color specified by a user.

Referring to FIG. 5C, when choice 205 is selected, a region 205A for specifying a value of red (R), a region 205B for specifying a value of green (G), a region 205C for specifying a value of blue (B) with respect to a conversion color, and a region 205D labeled with characters of "color sample" are displayed below choice 205. As in the method of designating the specification color, a user specifies respective regions 205A, 205B and 205C on the display screen to input values of red, green and blue, respectively, by using numeric keypad 92 to determine a conversion color. Region 205D is a button switch for an instruction to display a color sample. When a user touches region 205D with a finger, a color palette is displayed on a section of color conversion specifying screen 200. When a user touches a section thereof displaying a desired color in the displayed color palette, the color is determined as a conversion color, and its values of red, green and blue are determined. The determined values of red, green and blue are displayed in regions 205A, 205B and 205C, respectively. As such, since a user can select a desired color from the color palette without knowing respective values of red, green and blue thereof, a conversion color can easily be specified. Note that region 205D may simply be labeled with characters "color". In other words, region 205D may be provided with any label recognizable by a user as a button switch for an instruction to display a color sample.

When a user selects choice 204 or choice 205 on color conversion specifying screen 200, MFP 1 is set to a color conversion mode. Without using color conversion specifying screen 200, information for setting MFP 1 to a color conversion mode may be transmitted from user computers 4A and 4B along with print data. The information to be transmitted is similar to that input by color conversion specifying screen 200. In this case, at the point when a user inputs a print instruction from user computers 4A and 4B, a screen similar to color conversion specifying screen 200 may be displayed on user computers 4A and 4B for inputting required information. In this case, at the point when a user inputs a print instruction from user computers 4A and 4B, the user can instruct as to whether MFP 1 is to be set to a color conversion mode or not.

Figure 6:
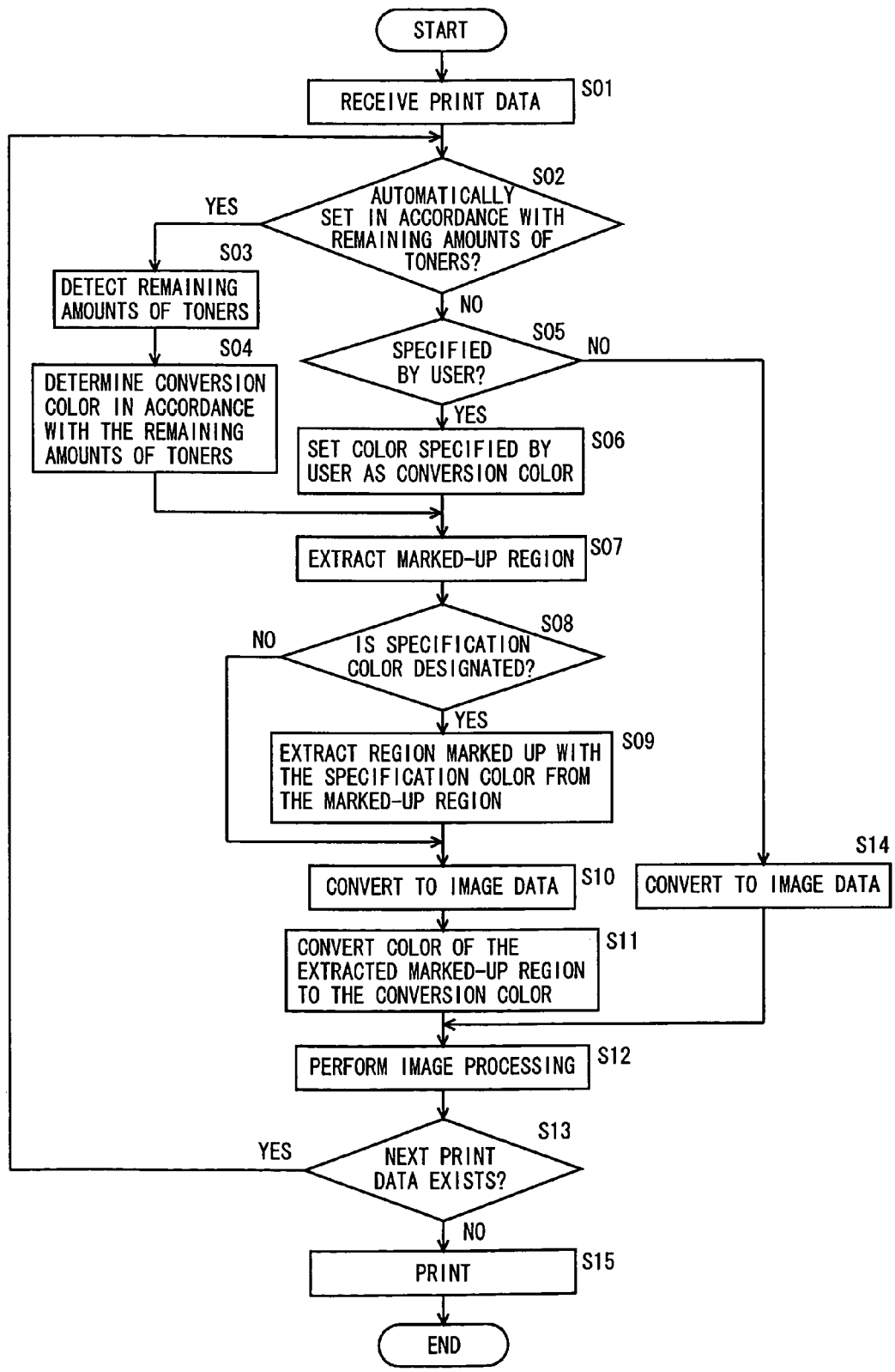
FIG. 6 is a flowchart illustrating a flow of a process performed in the MFP in the embodiment.

FIG. 6 is a flowchart illustrating a flow of a process performed in MFP 1 in this embodiment. Here, a description is given of a process performed when print data written in a page description language is received from user computers 4A and 4B.

In MFP 1, print data is initially input from communicating portion 11 (step S01). It is then determined if MFP 1 is set to a color conversion mode or information for setting MFP 1 to a color conversion mode is included along with the print data. In other words, in step S02, it is determined if MFP 1 is set to a color conversion mode in which a conversion color is automatically set in accordance with the remaining amounts of the toners. If so, the process proceeds to step S03. If not, the process proceeds to step S05. In step S05, it is determined if MFP 1 is set to a color conversion mode in which a conversion color is set by user specification. If so, the process proceeds to step S06. If not, the process proceeds to step S14.

When MFP 1 is set to the color conversion mode in which a conversion color is automatically set in accordance with the remaining amounts of the toner, steps S03 and S04 are performed and the process proceeds to step S07. In step S03, remaining amount detector 24 detects remaining amounts of the toners stored in toner containers mounted to developing units 116C, 116M, 116Y and 116K of four colors of cyan, magenta, yellow and black, respectively. In step S04, a conversion color is determined based on the remaining amounts of the toners. The conversion color may be determined based on either of (1) the ratio of the remaining amounts of the toners or (2) the remaining amounts of the toners. Alternatively, the conversion color may be determined based on the unit prices of the toners.

When MFP 1 is set to a color conversion mode in which a conversion color is set by user specification, step S06 is performed and the process proceeds to step S07. In step S06, a color specified by a user is set as a conversion color. The conversion color is specified in advance by a user using color conversion specifying screen 200, and stored in storage unit 26. The specified conversion color may be received along with the print data.

In step S07, marked-up region extract portion 21 extracts a marked-up region from the print data. It is then determined whether or not the specification color is stored in storage unit 26 (step S08). If the specification color is stored, the process proceeds to step S09. If not, the process proceeds to step S10. Though the specification color is stored in storage unit 26 in this embodiment, the specification color may be received from user computers 4A and 4B along with the print data. In this case, if the specification color is received, the process proceeds to step S09. If not, the process proceeds to step S10.

In step S09, out of the marked-up region extracted in step S07, only a region marked up with the specification color stored in storage unit 26 or with the specification color received along with the print data is extracted. Accordingly, a user can confine, with a color, a marked-up region on which color conversion is to be performed.

In step S10, the print data is converted to image data of cyan (C), magenta (M), yellow (Y) and black (K). A pixel value of the marked-up region extracted in step S09 is converted to that of the conversion color (step S11). The conversion color here is either of the conversion color determined in step S04 or the conversion color set by user specification in step S06.

Image processing is then performed on the CMYK image data whose color has been converted to the conversion color (step S12). Image processing includes, for example, smoothing process, edge enhancement process, skew correction process, color matching process, contrast adjustment process and the like. By adjusting contrast, the conversion color is corrected to enhance contrast relative to a color of surrounding pixels.

It is then determined if next print data exists or not (step S13). If it exists, the process returns to step S02 and the process of steps S02-S12 described above is executed for the next print data. If MFP 1 is set to a color conversion mode in which a conversion color is automatically set in accordance with the remaining amounts of the toners, the remaining amounts of the toners for each print data is detected (step S03) and the conversion color are determined in accordance with the detected remaining amounts thereof (step S04). Accordingly, the conversion color is determined based on the remaining amounts of the toners which alter as the print data is printed. Alternatively, the process from steps S02 to S04 may be performed each time a prescribed number of sheets are printed, for example, for a hundred sheets, not for each print data. Accordingly, since the conversion color is reset each time a hundred sheets are printed, the conversion color can be determined based on the remaining amounts of the toners which alter based on the number of printed sheets.

In step S15, the image data is output to printer 102 and an image thereof is generated on a recording medium such as paper.

In MFP 1 in the embodiment as described above, a color of a marked-up region is converted to a conversion color in printing. Accordingly, the marked-up region can be printed in a color appropriate for printing.

Furthermore, out of the marked-up region, only a region marked up with a specification color is printed in a conversion color. Accordingly, only a region marked up by a color specified by a user can be printed in a color appropriate for printing.

Furthermore, it can be determined whether MFP 1 is to be set to a color conversion mode or not. Accordingly, a user himself/herself can decide whether the marked-up region is to be printed in a color appropriate for printing or not.

Furthermore, the remaining amounts of the toners of cyan, magenta and yellow are detected and a conversion color is determined based on the same. Accordingly, if a conversion color is defined as a color in which a toner remaining in larger amount is contained in larger amount relative to other toners, for example, the remaining amounts of the toners can be equalized. In addition, the remaining amount of the toner of one color can be prevented from being excessively decreased relative to that of other colors.

Furthermore, a conversion color is determined based on the ratio of the remaining amounts of toners of cyan, magenta and yellow. Accordingly, the remaining amounts of the toners can be equalized as much as possible. In addition, the remaining amount of the toner of one color can be prevented from being excessively decreased relative to that of other colors.

Furthermore, a conversion color is determined based on the unit prices of the toners of cyan, magenta and yellow except for black. Accordingly, if a conversion color is defined as a color in which a toner of a lower unit price is contained in larger amount relative to other toners, for example, the consumption cost of the toner can be lowered.

Furthermore, a specification color and a conversion color can be specified by a user. Accordingly, a region marked up with a color which will be less visible when printed can be converted to be printed in a more visible color.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. An image generating apparatus comprising:
    an input portion for inputting print data including a marked-up region with a first color;
    an extract portion for extracting the marked-up region from the print data based on the first color;
    a converter for converting the first color of the extracted region to a second color different from a color of another region; and
    an image generator for printing the print data including the marked-up region whose color has been converted.

2. The image generating apparatus according to claim 1, further comprising a conversion color input portion for receiving an input of designation of the second color.

3. The image generating apparatus according to claim 1, wherein the first color is different from black.

4. The image generating apparatus according to claim 1, further comprising:
    a selection instruction receiver for receiving an instruction as to a selection of whether said converter is to perform conversion or not; and
    a switch portion for switching said converter between an activated state and a non-activated state according to said selection.

5. The image generating apparatus according to claim 1, further comprising:
    a remaining amount detector for detecting a remaining amount of each of a plurality of types of color materials; and
    a color determination portion for determining the second color based on said detected remaining amount.

6. The image generating apparatus according to claim 5, further comprising a correcting portion for correcting the color determined by said color determination portion with respect to contrast.

7. The image generating apparatus according to claim 5, wherein said color determination portion selects at least one of said plurality of types of color materials in descending order in terms of remaining amounts of the color materials so as to determine the second color.

8. The image generating apparatus according to claim 5, wherein said color determination portion selects a color material of the largest remaining amount out of said plurality of types of color materials.

9. The image generating apparatus according to claim 5, wherein said color determination portion determines the second color based on a ratio between respective remaining amounts of said plurality of types of color materials.

10. The image generating apparatus according to claim 9, wherein said color determination portion determines a ratio between all of said plurality of types of color materials based on the ratio of respective remaining amounts of said plurality of types of color materials.

11. The image generating apparatus according to claim 1, further comprising:
    a unit price storage unit for storing a unit price of each of a plurality of types of color materials; and
    a color determination portion for determining the second color based on the unit price of each of said plurality of types of color materials except for black.

12. The image generating apparatus according to claim 11, wherein said color determination portion selects at least one of said plurality of types of color materials in ascending order in terms of unit prices of the color materials so as to determine the second color.

13. The image generating apparatus according to claim 11, wherein said color determination portion selects a color material of the lowest unit price out of said plurality of types of color materials.

14. The image generating apparatus according to claim 11, wherein said color determination portion determines a ratio between all of said plurality of types of color materials based on the unit price of each of said plurality of types of color materials.

15. An image generating apparatus comprising:
    an input portion for inputting print data including a marked-up region with a first color;
    a receiver for receiving a designation of the first color;
    an extract portion for extracting the marked-up region from the input print data based on the first color, the first color being different from prescribed colors of another region;
    an acquisition portion for acquiring information about a remaining amount of a color material;
    a converter for converting the first color of the extracted region to a second color different from a color of the another region based on the information about the remaining amount of a color material; and
    an output portion for outputting the print data including the marked-up region whose color has been converted.

16. An image processing apparatus comprising:
    an input portion for inputting data to be processed including a marked-up region with a first color;
    a first receiver for receiving a designation of the first color;
    a converter for converting the first color of the marked-up region, identified based on the first color, to a second color different from a color of another region;

a second receiver for receiving an instruction as to whether said converter is to perform conversion or not;

a controller for activating said converter if said second receiver receives an instruction to perform conversion; and an image processor for performing image processing on said marked-up region as data of the second color converted by said converter.

17. The image processing apparatus according to claim 16, wherein said image processing is contrast enhancement process.

18. The image processing apparatus according to claim 16, further comprising extract portion configured to extract a region marked up with the first color.

19. The image processing apparatus according to claim 16, further comprising:

a remaining amount detector for detecting a remaining amount of each of a plurality of types of color materials; and a color determination portion for determining said another the second color based on said detected remaining amount.

20. A print data processing program embodied in a computer-readable medium allowing a computer to perform the steps of:

inputting print data including a marked-up region with a first color;

receiving a designation of the first color;

extracting the marked-up region from said print data based on the first color; and converting the first color of the extracted region to a second color different from a color of the another region.

21. The print data processing program according to claim 20, further allowing a computer to perform the steps of:

detecting a remaining amount of each of a plurality of types of color materials; and determining said second color based on said detected remaining amount.

22. The print data processing program according to claim 20, wherein said computer includes a unit price storage unit for storing a unit price of each of a plurality of types of color materials, and the print data processing program further allowing a computer to perform the step of determining said second color based on the unit price of each of said plurality of types of color materials except for black.

23. A method of processing print data, allowing a computer to perform the steps of:

inputting print data including a marked-up region with a first color;

extracting the marked-up region based on the first color; and converting the first color of said extracted region to a second color different from a color of another region.

24. The method of processing print data according to claim 23, further allowing a computer to perform the steps of:

detecting a remaining amount of each of a plurality of types of color materials; and determining said second color based on said detected remaining amount.

25. The method of processing print data according to claim 23, wherein said computer includes a unit price storage unit for storing a unit price of each of a plurality of types of color materials, and the method further allowing a computer to perform the step of determining said second color based on the unit price of each of said plurality of types of color materials except for black.

26. The method of processing print data according to claim 23, further allowing a computer to perform the steps of receiving an input of designation of the first color and receiving an input of said second color.

27. A method of image processing comprising the steps of:

inputting data to be processed including a marked-up region with a first color;

converting the first color of the marked-up region, identified in the data based on the first color, to a second color different from a color of another region;

receiving an instruction as to whether said converting step is to perform conversion or not;

executing said converting step if the instruction to perform conversion is received; and performing image processing on the marked-up region as data of the converted color.

* * * * *